(12) United States Patent
Yang et al.

(10) Patent No.: US 12,363,628 B2
(45) Date of Patent: Jul. 15, 2025

(54) ELECTRONIC DEVICE FOR ACQUIRING NETWORK INFORMATION AND METHOD FOR OPERATING SAME

(71) Applicant: SAMSUNG ELECTRONICS CO., LTD., Suwon-si (KR)

(72) Inventors: Suyong Yang, Suwon-si (KR); Sukkyung Yoon, Suwon-si (KR); Dongsuk Jung, Suwon-si (KR); Jinyup Kim, Suwon-si (KR); Myonghwan Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 17/854,760

(22) Filed: Jun. 30, 2022

(65) Prior Publication Data
US 2023/0067521 A1 Mar. 2, 2023

Related U.S. Application Data

(63) Continuation of application No. PCT/KR2022/007675, filed on May 30, 2022.

(30) Foreign Application Priority Data

Aug. 30, 2021 (KR) .................. 10-2021-0114971
Dec. 7, 2021 (KR) .................. 10-2021-0174132

(51) Int. Cl.
*H04W 48/18* (2009.01)
*H04W 48/16* (2009.01)
*H04W 60/00* (2009.01)

(52) U.S. Cl.
CPC ........... *H04W 48/18* (2013.01); *H04W 48/16* (2013.01); *H04W 60/00* (2013.01)

(58) Field of Classification Search
None
See application file for complete search history.

(56) References Cited

U.S. PATENT DOCUMENTS

| 9,031,555 B2 * | 5/2015 | Kim ............. H04W 48/18 455/445 |
| 10,986,570 B1 | 4/2021 | Menon et al. |

(Continued)

FOREIGN PATENT DOCUMENTS

| CN | 108934006 | 12/2018 |
| CN | 108966331 | 12/2018 |

(Continued)

OTHER PUBLICATIONS

Search Report and Written Opinion dated Sep. 7, 2022 issued in International Patent Application No. PCT/KR2022/007675.
(Continued)

*Primary Examiner* — Kenneth B Wells
(74) *Attorney, Agent, or Firm* — NIXON & VANDERHYE P.C.

(57) ABSTRACT

Various embodiments of the disclosure relate to a device and a method for obtaining information on a cellular network through direct communication in an electronic device. The electronic device may include: a memory, a first communication circuit, a second communication circuit, and a processor, and the processor may be configured to control the electronic device to: identify a country in which the electronic device is located using the first communication circuit, obtain network information of at least one external electronic device through direct communication using the second communication circuit based on determining that the country in which the electronic device is located has changed, detect a PLMN to which the electronic device is accessible based on the network information of the at least one external electronic device, perform a network search (Continued)

related to the detected PLMN through the first communication circuit, and perform a network registration procedure through a detected cell based on the network search through the first communication circuit.

16 Claims, 10 Drawing Sheets

(56) References Cited

U.S. PATENT DOCUMENTS

| | | | |
|---|---|---|---|
| 2011/0256869 A1 | 10/2011 | Zhang et al. | |
| 2012/0083268 A1 | 4/2012 | Lung et al. | |
| 2018/0098338 A1* | 4/2018 | Choi ...................... | H04W 4/80 |
| 2019/0223003 A1 | 7/2019 | Balasubramanian et al. | |
| 2020/0092798 A1 | 3/2020 | Abraham et al. | |
| 2020/0178153 A1* | 6/2020 | Jun ...................... | H04W 40/248 |
| 2020/0184977 A1* | 6/2020 | Song ...................... | H04W 4/80 |
| 2021/0076314 A1* | 3/2021 | Wang ...................... | H04B 17/26 |
| 2021/0185577 A1 | 6/2021 | Subramaniam et al. | |

FOREIGN PATENT DOCUMENTS

| | | |
|---|---|---|
| KR | 10-1832070 | 2/2018 |
| KR | 10-2176886 | 11/2020 |

OTHER PUBLICATIONS

European Extended Search Report dated Oct. 4, 2024 for EP Application No. 22864823.4.

\* cited by examiner

ELECTRONIC DEVICE FOR ACQUIRING NETWORK INFORMATION AND METHOD FOR OPERATING SAME

CROSS-REFERENCE TO RELATED APPLICATIONS

This application is a continuation of International Application No. PCT/KR2022/007675 designating the United States, filed on May 30, 2022, in the Korean Intellectual Property Receiving Office and claiming priority to Korean Patent Application No. 10-2021-0114971, filed on Aug. 30, 2021, in the Korean Intellectual Property Office, and to Korean Patent Application No. 10-2021-0174132, filed on Dec. 7, 2021, in the Korean Intellectual Property Office, the disclosures of all of which are incorporated by reference herein in their entireties.

BACKGROUND

Field

The disclosure relates to an apparatus and a method for acquiring information of a cellular network through direction communication in an electronic device.

Description of Related Art

An electronic device may perform a process of registering (or accessing) a network (or base station) for wireless communication. The electronic device may store information (for example, cell information or base station information) used for registration in the network (or base station).

When registering a network in a region (for example, nation) in which a registration history of the electronic device exists, the electronic device may perform network registration using information used at a timepoint prior to the network registration.

When registering a network in a region (for example, nation) in which no registration history of the electronic device exists, the electronic device may acquire network information by performing a network search with regard to all supportable frequency bands. The electronic device may perform network registration based on network information acquired through the network search.

When an electronic device is supplied with power or is away from a shaded area, a network search may be performed to search for a cell to be accessed (or registered) by the electronic device. For example, when the electronic device is supplied with power or is away from a shaded area, information related to a PLMN stored in a subscriber identity module (SIM) of the electronic device may be acquired. For example, the information related to the PLMN may include information related to a registered public land mobile network (RPLMN), a home PLMN (HPLMN), and/or a preferred PLMN (PPLMN). When the electronic device has failed to find the RPLMN, HPLMN, and/or PPLMN through a network search based on information related to the PLMN, the electronic device may perform a network search (for example, full band scan) regarding all frequency bands that can be supported by the electronic device.

When information regarding a PLMN stored in a SIM (for example, information related to PPLMN) and information related to a PLMN of a network installed in an actual environment are different, the electronic device needs to perform a network search (for example, full band scan) regarding all frequencies that can be supported by the electronic device for PLMN registration, and this may result in a time delay due to a network search.

SUMMARY

Embodiments of the disclosure provide an apparatus and a method for reducing a time delay due to a network search in an electronic device.

According to various example embodiments, an electronic device may include: a memory, a first communication circuit configured to support cellular communication, a second communication circuit configured to support Bluetooth low energy (BLE), and a processor operatively connected with the memory, the first communication circuit, and the second communication circuit, wherein the processor is configured to control the electronic device to: identify a country in which the electronic device is located using the first communication circuit, obtain network information of at least one external electronic device through direct communication using the second communication circuit based on determining that the country in which the electronic device is located has changed, detect a public land mobile network (PLMN) to which the electronic device is accessible based on the network information of the at least one external electronic device, perform a network search related to the detected PLMN through the first communication circuit, and perform a network registration procedure through a detected cell based on the network search through the first communication circuit.

According to various example embodiments, a method of operating an electronic device may include: identifying a country in which the electronic device is located through cellular communication, obtaining network information of at least one external electronic device through direct communication based on a Bluetooth low energy (BLE) based on determining that the country in which the electronic device is located has changed, detecting a public land mobile network (PLMN) to which the electronic device is accessible based on the network information of the at least one external electronic device, performing a network search related to the detected PLMN through the cellular communication, and performing a network registration procedure through a detected cell based on the network search through the cellular communication.

According to various example embodiments of the disclosure, an electronic device may share information of a cellular network with at least one external electronic device through direct communication (for example, device to device (D2D)) in a roaming state, thereby reducing a time delay due to a network search.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to attached drawings.

Figure 1:
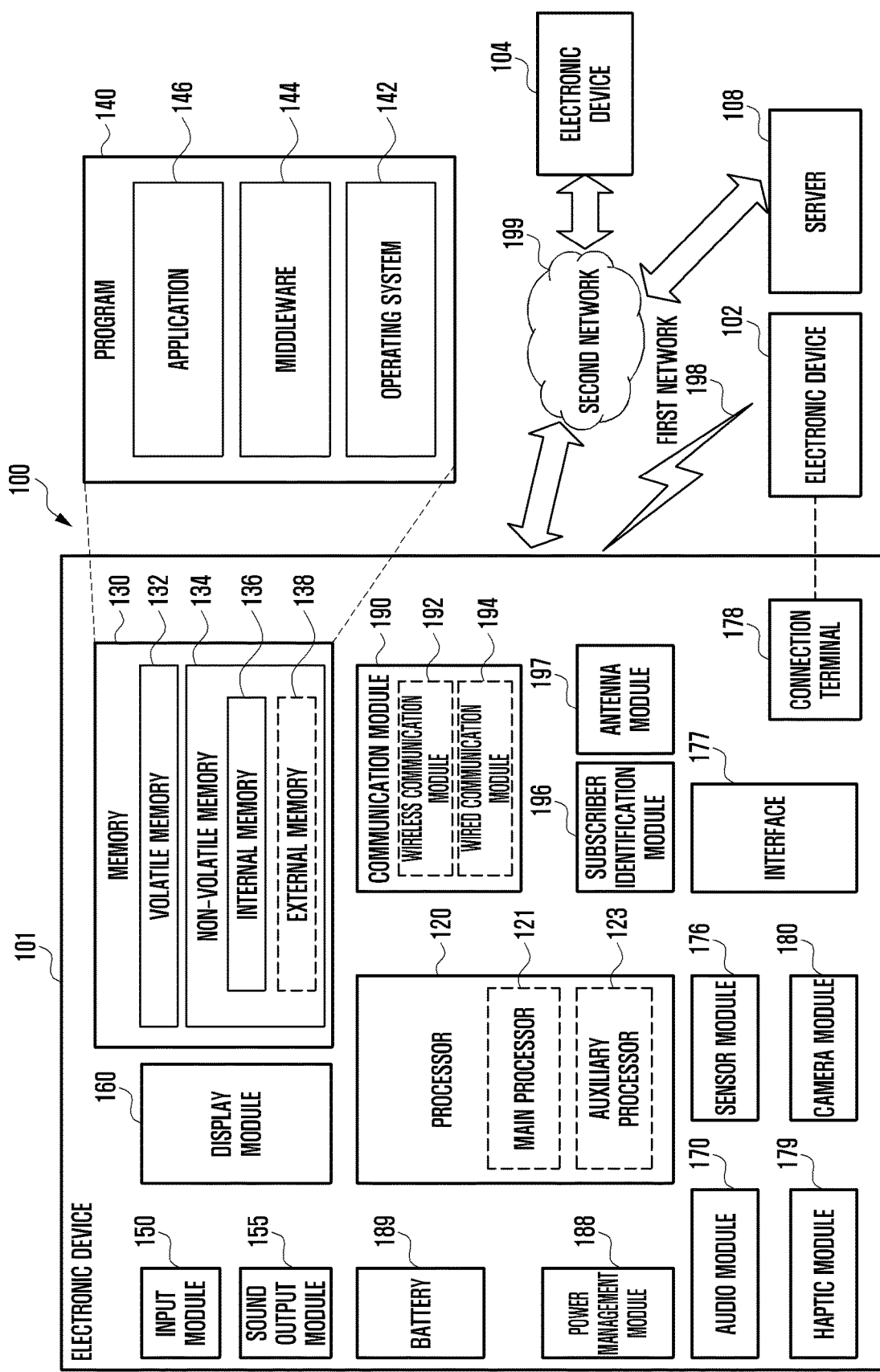
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
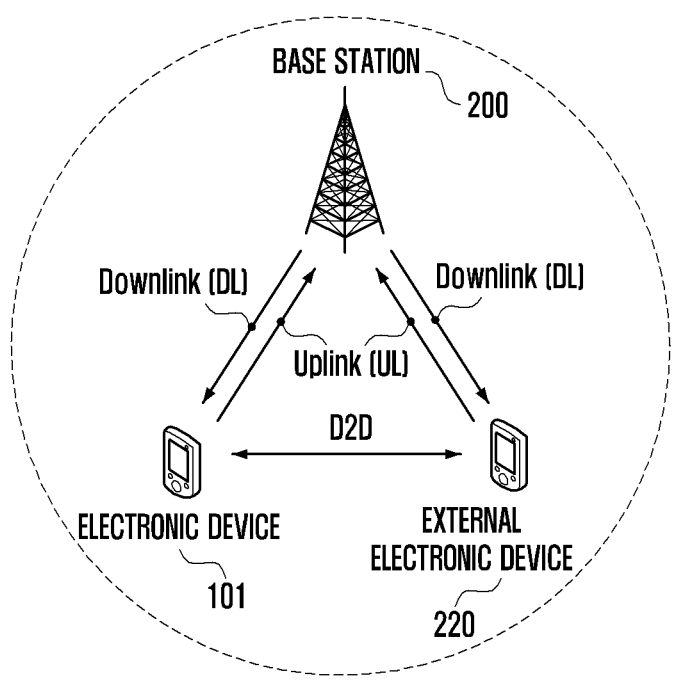
FIG. 2 is a diagram illustrating an example of a wireless communication system supporting direct communication according to various embodiments.

FIG. 2 is a diagram illustrating an example of a wireless communication system supporting direct communication according to various embodiments.

According to various embodiments with reference to FIG. 2, an external electronic device 220 may be located within the coverage of a base station 200. According to an embodiment, the external electronic device 220 may receive data and/or signals (e.g., control information) from the base station 200 through a downlink (DL). The external electronic device 220 may transmit data and/or signals (e.g., control information) to the base station 200 through an uplink (UL). For example, the coverage of the base station 200 may include an area (or service area) capable of transmitting and/or receiving data and/or signals to/from the base station 200.

According to various embodiments, the electronic device 101 may transmit and/or receive data and/or signals (e.g., control information) to/from the external electronic device 220 through direct communication (e.g., device to device (D2D)) based, for example, on Bluetooth low energy (BLE).

According to various embodiments, the electronic device 101 may access the base station 200 based on network information provided from the external electronic device 220 through direct communication based on the BLE. According to an embodiment, in a case where the electronic device 101 enters into the coverage area of the base station 200, the electronic device 101 may obtain network information related to the base station 200 from the external electronic device 220 through direct communication. The electronic device 101 may access the base station 200 based on network information related to the base station 200 obtained from the external electronic device 220. According to an embodiment, the electronic device 101 may receive data and/or signals (e.g., control information) from the base station 200 through a downlink (DL) based on the access to the base station 200. The electronic device 101 may transmit data and/or signals (e.g., control information) to the base station 200 through an uplink (UL) based on the access to the base station 200.

According to various embodiments, the electronic device 101 and the external electronic device 220 may perform direct communication based on the BLE. However, direct communication between the electronic device 101 and the external electronic device 220 is not limited to direct communication based on the BLE, and may include direct communication based on a near field communication network such as a wireless LAN (e.g., Wi-Fi), Bluetooth, and/or an ultra-wideband (UWB). For example, direct communication may support a multi-peer connectivity framework (MCF).

Figure 3:
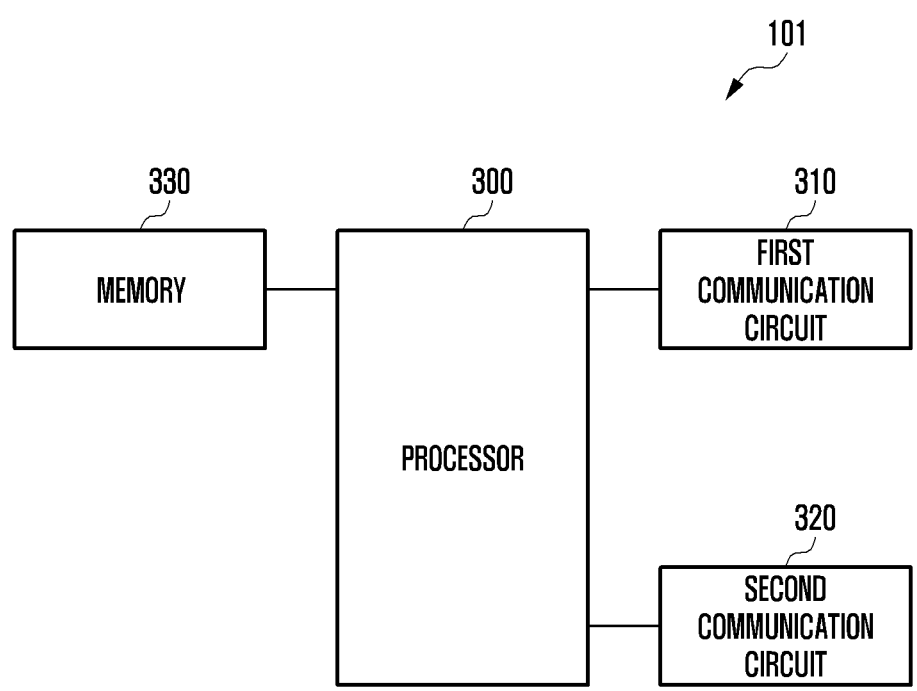
FIG. 3 is a block diagram illustrating an example configuration of an electronic device for obtaining network information through direct communication according to various embodiments.

FIG. 3 is a block diagram illustrating an example configuration of an electronic device for obtaining network information through direct communication according to various embodiments.

According to various embodiments with reference to FIG. 3, the electronic device 101 may include a processor (e.g., including processing circuitry) 300, a first communication circuit 310, a second communication circuit 320, and/or a memory 330. According to an embodiment, the processor 300 may be substantially the same as the processor 120 of FIG. 1, or may include the processor 120. The first communication circuit 310 and/or the second communication circuit 320 may be substantially the same as the wireless communication module 192 of FIG. 1, or may include the wireless communication module 192. The memory 330 may be substantially the same as the memory 130 of FIG. 1, or may include the memory 130. According to an embodiment, the processor 300 may be operatively connected to the first communication circuit 310, the second communication circuit 320, and/or the memory 330.

According to various embodiments, in a case where the first communication circuit 310 in the inactive state is switched to the active state, the processor 300 may identify whether the country in which the electronic device 101 is located has changed. According to an embodiment, the processor 300 may include an application processor (AP) and/or a communication processor (CP). For example, in a case where the first communication circuit 310 in the inactive state is switched to the active state, the application processor and/or the communication processor may identify whether the country in which the electronic device 101 is located has changed. For example, the state in which the first communication circuit 310 in the inactive state is switched to the active state may include a state in which power is supplied to the electronic device 101 (e.g., power on), a state in which the airplane mode of the electronic device 101 is released, and/or a state in which power is supplied to the first communication circuit 310. For example, the state in which the country in which the electronic device 101 is located has changed may include a roaming state. For example, the roaming state may include a state in which the electronic device 101 has moved to another area (e.g., a country) in which a communication service provider operating a network is different.

According to an embodiment, in a case where the first communication circuit 310 in the inactive state is switched to the active state, the processor 300 may identify the country in which the electronic device 101 is located based on an MCC and/or a mobile network code (MNC) of an area in which the electronic device 101 obtained through a network search related to the mobile country code (MCC). When it is determined that the country in which the electronic device 101 is located has changed, the processor 300 may determine that the electronic device 101 is in a roaming state. For example, the network search related to the MCC may include a series of operations of performing a network search for a designated frequency band. For example, the country in which the electronic device 101 is located may be obtained based on system information (e.g., master information block (MIB) and/or system information block (SIB) 1) obtained through a network search related to the MCC.

According to an embodiment, in a case where the first communication circuit 310 in the inactive state is switched to the active state, the processor 300 may obtain information related to the MCC and/or the MNC of the area in which the electronic device 101 is located through the first communication circuit 310 through a network search related to the registered public land mobile network (RPLMN), the home PLMN (HPLMN), and/or the preferred PLMN. The processor 300 may determine that the electronic device 101 is in a roaming state when it is determined that the country in which the electronic device 101 is located has changed based on information related to MCC and/or MNC in the area in which the electronic device 101 is located.

According to various embodiments, when it is determined that the electronic device 101 is in a roaming state, the processor 300 may control the second communication circuit 320 to check network information of the external electronic device 220. According to an embodiment, when it is determined that the electronic device 101 is in a roaming state, the processor 300 may identify the network information of the at least one external electronic device 220 in the response message related to the network information received through the second communication circuit 320 in response to the request message related to the network information. For example, the request message related to the network information may be transmitted (or broadcasted) through direct communication at a time when the first communication circuit 310 in the inactive state is switched to the active state or when it is determined that the country in which the electronic device 101 is located has changed. For example, the request message related to the network information may include a BLE advertising message including indication information related to the request of the network information and/or information related to the home PLMN of the electronic device 101 (e.g., MCC and/or MNC). For example, the response message related to the network information may include a BLE response message or a BLE advertising message including indication information related to the response of the network information and/or network information of the external electronic device 220. For example, the network information of the external electronic device 220 may include information related to a PLMN of the external electronic device 220, a radio access technology (RAT), a registration state of the external electronic device 220 to a network, and/or a registration time point of the external electronic device 220 to the network. For example, the PLMN of the external electronic device 220 may include a PLMN of a network in which the external electronic device 220 is to be registered or registered. For example, the RAT of the external electronic device 220 may include the RAT of the network in which the external electronic device 220 is to be registered or registered. For example, the network information of the external electronic device 220 may include the network information of the external electronic device 220 related to the home PLMN of the electronic device 101.

According to various embodiments, the processor 300 may detect a target PLMN for registration by the electronic device 101 based on the network information of the external electronic device 220 and/or the network information of the electronic device 101 corresponding to the country in which the electronic device 101 is located. According to an embodiment, the processor 300 may select the target PLMN for registration by the electronic device 101 based on a registration time point into a network included in the network information of at least one external electronic device 220 obtained through direct communication. For example, the target PLMN may include a PLMN related to the external electronic device 220 having the most recent registration time to the network among at least one external electronic device 220.

According to an embodiment, the processor 300 may generate (or update) a shared network list corresponding to the country in which the electronic device 101 is located based on network information of at least one external electronic device 220 obtained through direct communication. The processor 300 may select a target PLMN for registration by the electronic device 101 based on a registration time point of the external electronic device 220 included in the shared network list. For example, the processor 300 may remove redundant network information from network information of at least one external electronic device 220 obtained through direct communication to generate (or update) a shared network list corresponding to the country in which the electronic device 101 is located. For example, the shared network list may include information related to the PLMN and RAT of the external electronic device 220 and/or the registration time of the external electronic device 220 to the network.

According to an embodiment, the processor 300 may identify whether network information of at least one external electronic device 220 obtained through direct communication exists. For example, when it is determined that the network information of at least one external electronic device 220 obtained through direct communication exists, the processor 300 may select a target PLMN for registration by the electronic device 101 based on network information of the external electronic device 220 and/or network information of the electronic device 101 corresponding to the country in which the electronic device 101 is located. For example, the target PLMN may include the PLMN associated with the external electronic device 220 or the electronic device 101 in which the registration time to the network is most recent. For example, the network information of the electronic device 101 corresponding to the country in which the electronic device 101 is located may include information related to PLMN, RAT, and/or registration time when the electronic device 101 is registered or to be registered in the country in which the electronic device 101 is located According to an embodiment, when it is determined that network information of at least one external electronic device 220 obtained through direct communication does not exist, the processor 300 may select a target PLMN for registration by the electronic device 101 based on network information of the electronic device 101 corresponding to the country in which the electronic device 101 is located. For example, the target PLMN may include a PLMN related to the electronic device 101 in which the registration time point to the identified network is most recent based on network information of the electronic device 101 corresponding to the country in which the electronic device 101 is located.

According to various embodiments, the processor 300 may control the first communication circuit 310 to perform a network search based on a target PLMN related to the electronic device 101. For example, the network search based on the target PLMN may include a series of operations for performing a network search related to a frequency (or frequency band) of the target PLMN.

According to various embodiments, the processor 300 may control the first communication circuit 310 to perform a network registration procedure (or a cell access procedure) through a cell detected through the network search based on the target PLMN related to the electronic device 101. According to an embodiment, the processor 300 may select a cell (e.g., a best cell) for the electronic device 101 to access based on signal quality of the cell searched through the network search based on the target PLMN related to the electronic device 101. The processor 300 may control the first communication circuit 310 to perform a network registration procedure (or a cell access procedure) through a cell for access by the electronic device 101. For example, the signal quality of the cell may include at least one of reference signal received power (RSRP), reference signal received quality (RSRQ), received signal strength indicator (RSSI), and signal to interference plus noise ratio (SINR). For example, the network registration procedure may include a series of operations in which the electronic device 101 performs registration to the network (e.g., a core network) through a radio resource allocated through an access procedure (e.g., a cell access procedure) with a cell (e.g., a base station 200). For example, the cell access procedure may include a series of operations in which the electronic device 101 performs access to the cell (e.g., the base station 200).

According to various embodiments, the processor 300 may control the second communication circuit 320 to share network information of the electronic device 101 with at least one external electronic device through direct communication. According to an embodiment, in a case where the request message related to the network information is received through the second communication circuit 320, the processor 300 may identify whether the request message related to the network information satisfies a designated sharing condition. In a case where the processor 300 determines that the request message related to the network information satisfies the designated sharing condition, the processor 300 may control the second communication circuit 320 to transmit the network information of the electronic device 101 to the external electronic device 220 through direct communication. For example, the state satisfying the designated sharing condition may include a state in which identification information of the external electronic device 101 related to direct communication is included in identification information configured for sharing network information. For example, the identification information of the external electronic device 220 may include a network operator (e.g., a home PLMN) operating a cellular network supported by the external electronic device 220, a manufacturer of the external electronic device 220, and/or a predefined shared identity (ID). For example, the identification information configured for sharing network information may include information related to the external electronic device 220 for sharing network information by the electronic device 101. For example, the state satisfying the designated sharing condition may include a state in which information related to the home PLMN included in the request message related to the network information is the same as the home PLMN of the electronic device 101.

According to various embodiments, the first communication circuit 310 may support cellular communication of the electronic device 101. According to an embodiment, the first communication circuit 310 may support cellular communication with an external device (e.g., the base station 200 of FIG. 2) through a cellular network. For example, the first communication circuit 310 may include a radio frequency integrated circuit (RFIC) and a radio frequency front end (RFFE) for cellular communication. For example, the cellular network may include a 2G network (e.g., global system for mobile communications (GSM)), a 3G network (e.g., universal mobile telecommunications system (UMTS)), a 4G network (e.g., long-term evolution (LTE)), and/or a 5G network (e.g., new radio (NR)).

According to various embodiments, the second communication circuit 320 may support direct communication of the electronic device 101. According to an embodiment, the second communication circuit 320 may transmit and/or receive data and/or control information to and from at least one external electronic device 220 through direct communication. For example, direct communication may be performed through a near field communication network such as at least one of a wireless LAN (e.g., Wi-Fi), Bluetooth, Bluetooth low energy (BLE), or ultra-wideband (UWB). According to an embodiment, the first communication circuit 310 and the second communication circuit 320 may be logically (e.g., software) divided. According to an embodiment, the first communication circuit 310 and the second communication circuit 320 may be configured with different circuits or different hardware.

According to various embodiments, the memory 330 may store various data used by at least one component (e.g., the processor 300, the first communication circuit 310 and/or the second communication circuit 320) of the electronic device 101. According to an embodiment, the data may include network information of at least one external electronic device 220 obtained through direct communication, a shared network list, and/or network information of the electronic device 101. According to an embodiment, the memory 330 may store various instructions that may be executed through the processor 300.

According to various embodiments, the processor 300 may identify a country in which the electronic device 101 is located based on at least one of a global navigation satellite system (GNSS), a phone number, a carrier portability code (CPC), an international mobile equipment identity (IMEI), an international mobile subscriber identity (IMSI), an electronic network code (MNC), wireless fidelity (Wi-Fi), and a data network (e.g., an IP address).

According to various embodiments, the processor 300 may control the second communication circuit 320 to periodically collect network information of the external electronic device 220 through direct communication. According to an embodiment, the processor 300 may control the second communication circuit 320 to collect network information of the external electronic device 220 through direct communication based on a designated period from a time point when network information of the external electronic device 220 is obtained through direct communication based on the roaming state of the electronic device 101.

According to various embodiments, when it is determined that network information of at least one external electronic device 220 obtained through direct communication and network information of the electronic device 101 corresponding to a country in which the electronic device 101 is located do not exist, the processor 300 may control the first communication circuit 310 may control the first communication circuit 310 to perform a network search (e.g., full band scan) for at least one frequency band that the electronic device 101 may support.

According to various embodiments, when it is determined that network information of at least one external electronic device 220 obtained through direct communication and network information of the electronic device 101 corresponding to a country in which the electronic device 101 is located do not exist, the processor 300 may control the first communication circuit 310 to perform a network search (e.g., full band scan) for at least one frequency band that the electronic device 101 may support.

According to various example embodiments, the electronic device 101 (e.g., the electronic device 101 of FIG. 1, 2 or 3) may include a memory (e.g., the memory 130 of FIG. 1 or the memory 330 of FIG. 3), a first communication circuit (e.g., the wireless communication module 192 of FIG. 1 or the first communication circuit 310 of FIG. 3) configured to support cellular communication, a second communication circuit (e.g., the wireless communication module 192 of FIG. 1 or the second communication circuit 320 of FIG. 3) configured to support Bluetooth low energy (BLE), and a processor (e.g., the processor 120 of FIG. 1 or the processor 300 of FIG. 3) operatively connected with the memory, the first communication circuit, and the second communication circuit, and the processor may be configured to control the electronic device to: identify a country in which the electronic device is located using the first communication circuit, obtain network information of at least one external electronic device through direct communication using the second communication circuit based on determining that the country in which the electronic device is located has changed, detect a public land mobile network (PLMN) to which the electronic device is accessible based on the network information of the at least one external electronic device, perform a network search related to the detected PLMN through the first communication circuit, and perform a network registration procedure through a detected cell based on the network search through the first communication circuit.

According to various example embodiments, in a case where the first communication circuit in an inactive state is switched to an active state, the processor may be configured to: identify at least one of a mobile country code (MCC) or a mobile network code (MNC) of an area in which the electronic device is located, and identify a country in which the electronic device is located based on at least one of the MCC and the MNC.

According to various example embodiments, the processor may be configured to: identify at least one of the MCC or the MNC of an area in which the electronic device is located based on at least one of a master information block (MIB) or a system information block 1 (SIB1) obtained through the first communication circuit switched to the active state.

According to various example embodiments, the processor may be configured to: transmit a BLE advertising request message including information related to a home PLMN (HPLMN) of the electronic device through the second communication circuit, and obtain network information of the at least one external electronic device from a response message received from at least one external electronic device in response to the BLE advertising request message.

According to various example embodiments, the processor may be configured to: transmit a BLE advertising request message including information related to a home PLMN (HPLMN) of the electronic device through the second communication circuit based on the first communication circuit in an inactive state being switched to an active state.

According to various example embodiments, the processor may be configured to: transmit a BLE advertising request message including information related to a home PLMN (HPLMN) of the electronic device through the second communication circuit based on determining that the country in which the electronic device is located has changed.

According to various example embodiments, the network information of the external electronic device may include information related to a PLMN, a radio access technology (RAT), a registration state, and/or a registration time.

According to various example embodiments, the processor may be configured to: detect a PLMN to which the electronic device is accessible based on a registration time of the PLMN included in the network information of the at least one external electronic device.

According to various example embodiments, the processor may be configured to: detect a PLMN to which the electronic device is accessible based on network information of the electronic device corresponding to a country in which the electronic device is located based on the processor not obtaining network information of at least one external electronic device through direct communication using the second communication circuit.

According to various example embodiments, the processor may be configured to: identify information related to a home PLMN (HPLMN) included in the request message based on the processor receiving the BLE advertising request message through the second communication circuit, and transmit a response message including network information of the electronic device through the second communication circuit based on determining that the HPLMN-related information included in the request message satisfies a designated sharing condition.

Figure 4:
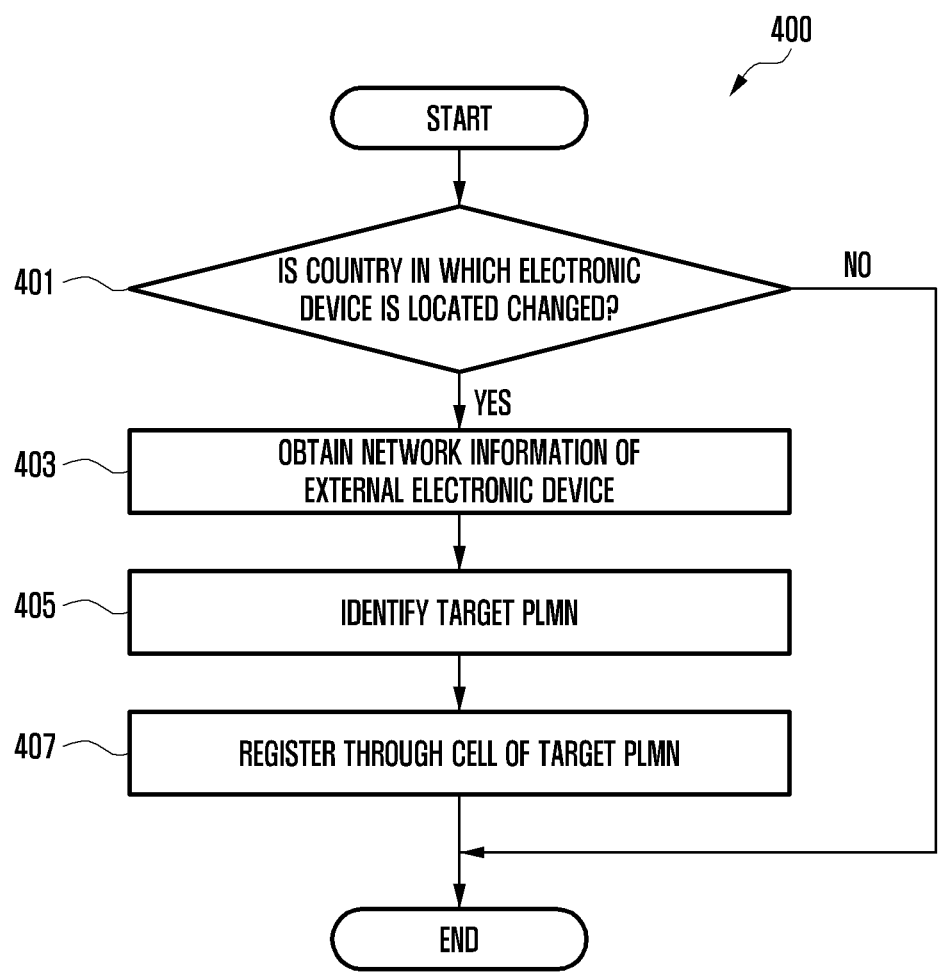
FIG. 4 is a flowchart illustrating an example process of registering in a network in an electronic device according to various embodiments.

FIG. 4 is a flowchart 400 illustrating an example process for registering in a network in an electronic device according to various embodiments. In the following embodiment, each operation may be sequentially performed, but is not necessarily sequentially performed. For example, the order of each operation may be changed, and at least two operations may be performed in parallel. For example, the electronic device of FIG. 4 may be the electronic device 101 of FIG. 1, 2, or 3.

According to various embodiments with reference to FIG. 4, in operation 401, the electronic device may identify whether a country in which the electronic device 101 (e.g., the processor 120 of FIG. 1 or the processor 300 of FIG. 3) is located has changed. According to an embodiment, in a case where the first communication circuit 310 in the inactive state is switched to the active state, the processor 300 may identify the country in which the electronic device 101 is located. For example, in a case where the first communication circuit 310 in the inactive state is switched to the active state, the processor 300 may identify the country in which the electronic device 101 is located based on the MCC and/or the mobile network code (MNC) of the area where the electronic device 101 obtained through a network search related to the mobile country code (MCC) is located. For example, the network search related to the MCC may include a series of operations of performing a network search for a designated frequency band. For example, the processor 300 may obtain information related to the MCC and/or the MNC of the area where the electronic device 101 is located through the first communication circuit 310 through a network search related to the registration PLMN, the home PLMN, and/or the preferred PLMN. The processor 300 may determine whether the country in which the electronic device 101 is located has changed based on information related to the MCC and/or MNC of the area in which the electronic device 101 is located. For example, in a case where the MCC of the area in which the electronic device 101 is located is different from the MCC of the registered PLMN of the electronic device 101, the processor 300 may determine that the country in which the electronic device 101 is located has changed. For example, in a case where the MCC of the area in which the electronic device 101 is located is the same as the MCC of the registered PLMN of the electronic device 101, the processor 300 may determine that the country in which the electronic device 101 is located has not been changed. For example, the state in which the first communication circuit 310 in the inactive state is switched to the active state may include a state in which power is supplied to the electronic device 101 (e.g., power on), a state in which the airplane mode of the electronic device 101 is released, and/or a state in which power is supplied to the first communication circuit 310.

According to various embodiments, when it is determined that the country in which the electronic device 101 is located has not been changed (e.g., 'No' in operation 401), the electronic device (e.g., the processor 120 or 300) may terminate the process for registering in the network.

According to various embodiments, when it is determined that the country in which the electronic device 101 is located has changed (e.g., 'Yes' in operation 401), the electronic device (e.g., the processor 120 or 300) may obtain network information of at least one external electronic device 220 through direct communication in operation 403. According to an embodiment, when it is determined that the country (or service area) in which the electronic device 101 is located has changed, the processor 300 may obtain network information of at least one external electronic device 220 from a response message related to network information received through the second communication circuit 320 in response to a request message related to network information. For example, the request message related to the network information may be transmitted (or broadcasted) through direct communication at a time when the first communication circuit 310 in the inactive state is switched to the active state or when it is determined that the country of the electronic device 101 is changed. For example, the request message related to the network information may include a BLE advertising message including indication information related to the request of the network information and/or information (e.g., MCC and/or MNC) related to the home PLMN of the electronic device 101. For example, the response message related to the network information may include a BLE response message or a BLE advertising message including indication information related to the response of the network information and/or information of the external electronic device 220. For example, the network information of the external electronic device 220 may include information related to the PLMN and RAT of the external electronic device 220, a registration state of the external electronic device 220 to the network, and/or a registration time point of the external electronic device 220. For example, the state in which the country in which the electronic device 101 is located has changed may include a roaming state.

According to various embodiments, in operation 405, the electronic device (e.g., the processor 120 or 300) may detect (or identify) a target PLMN for registration by the electronic device 101 based on network information of at least one external electronic device 220 and/or network information of the electronic device 101 corresponding to the country in which the electronic device 101 is located. According to an embodiment, the processor 300 may identify a PLMN related to at least one external electronic device 220 and a registration time point of at least one external electronic device 220 into a network based on network information of at least one external electronic device 220 obtained through direct communication. The processor 300 may select a PLMN related to the external electronic device 220 and/or the electronic device 101 having the most recent registration time to the network as the target PLMN. For example, the state in which the time point of registration to the network is the most recent may include a state in which the time point of registration to the network is closest to the current time.

According to various embodiments, in operation 407, the electronic device (e.g., the processor 120 or 300) may perform registration to the network through a cell of the target PLMN for registration by the electronic device 101. According to an embodiment, the processor 300 may control the first communication circuit 310 to perform a network search based on the target PLMN for registration by the electronic device 101. The processor 300 may select a cell (e.g., a best cell) for the electronic device 101 to access based on signal quality of the cell searched through a network search based on the target PLMN related to the electronic device 101. The processor 300 may control the first communication circuit 310 to perform a network registration procedure (or cell access procedure) through a cell for access by the electronic device 101. For example, the network search based on the target PLMN may include a series of operations of performing a network search related to the frequency band of the target PLMN. For example, the signal quality of the cell may include at least one of RSRP, RSRQ, RSSI, and SINR.

Figure 5:
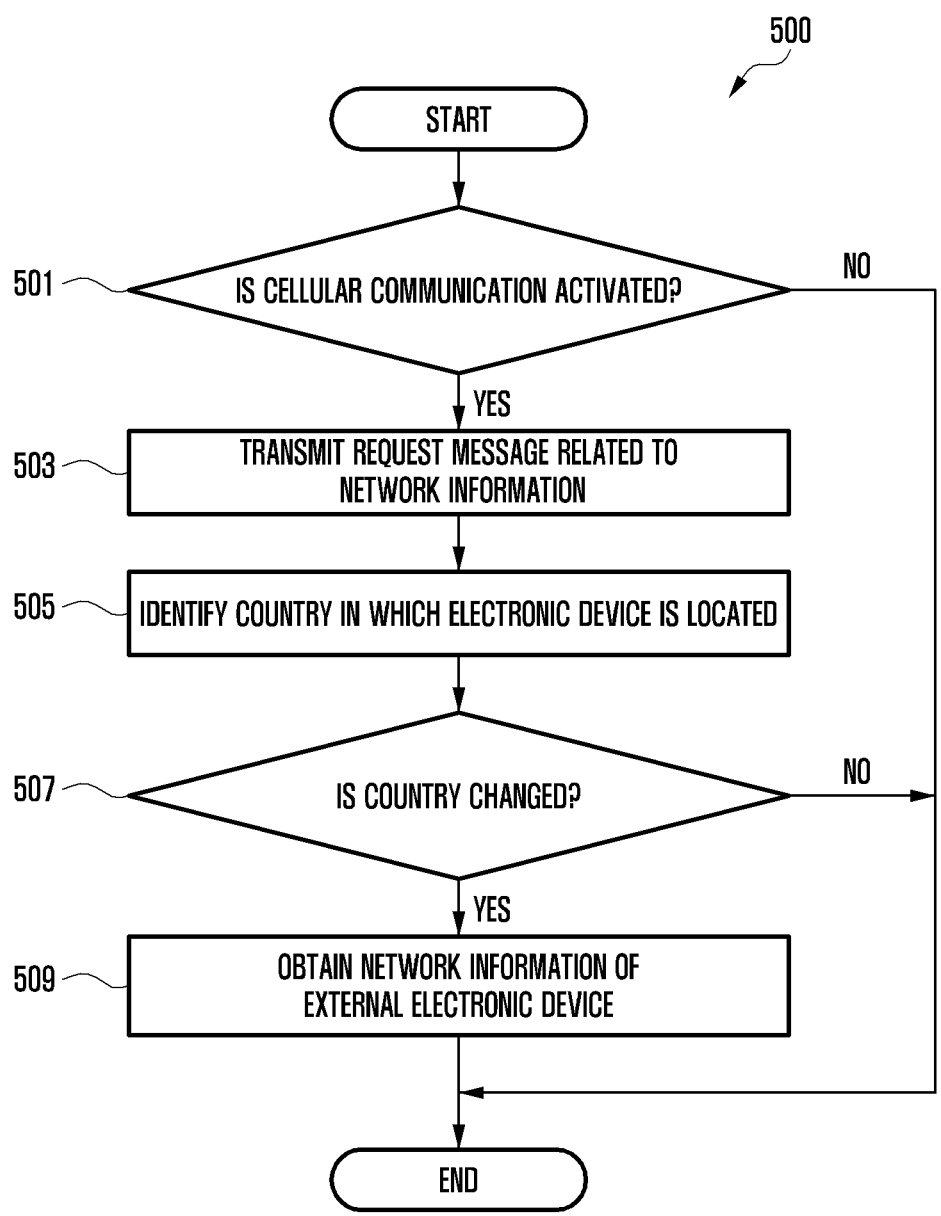
FIG. 5 is a flowchart illustrating an example process for obtaining network information in an electronic device according to various embodiments.

FIG. 5 is a flowchart 500 illustrating an example process of obtaining network information in an electronic device according to various embodiments. According to an embodiment, at least a portion of FIG. 5 may be detailed operations of operations 401 and 403 of FIG. 4. In the following embodiment, each operation may be sequentially performed, but is not necessarily sequentially performed. For example, the order of each operation may be changed, and at least two operations may be performed in parallel. For example, the electronic device of FIG. 5 may be the electronic device 101 of FIG. 1, 2, or 3.

According to various embodiments with reference to FIG. 5, in operation 501, the electronic device (e.g., the processor 120 of FIG. 1 or the processor 300 of FIG. 3) may identify whether cellular communication of the electronic device 101 is activated. According to an embodiment, in a case where power is supplied to the electronic device 101 (e.g., power on), the processor 300 may determine that the first communication circuit 310 in the inactive state is switched to the active state to activate cellular communication of the electronic device 101. According to an embodiment, when the airplane mode of the electronic device 101 is released, the processor 300 may determine that the first communication circuit 310 in the inactive state is switched to the active state to activate cellular communication of the electronic device 101. According to an embodiment, in a case where a menu related to activation of the cellular mode of the electronic device 101 is set, the processor 300 may determine that the first communication circuit 310 in the inactive state is switched to the active state to activate the cellular communication of the electronic device 101.

According to various embodiments, in a case where the cellular communication of the electronic device 101 is activated (e.g., 'Yes' in operation 501), the electronic device (e.g., the processor 120 or 300) may transmit (or broadcast) a request message related to network information through direct communication in operation 503. For example, the request message related to the network information may include a BLE advertising message including indication information related to a request of network information and/or information related to the home PLMN of the electronic device 101 (e.g., MCC and/or MNC).

According to various embodiments, in operation 505, the electronic device (e.g., the processor 120 or 300) may identify a country in which the electronic device 101 is located. According to an embodiment, the processor 300 may identify the country in which the electronic device 101 is located based on the MCC and/or MNC of the area where the electronic device 101 is located, obtained through a network search related to the MCC. According to an embodiment, the processor 300 may identify the country in which the electronic device 101 is located based on the MCC and/or MNC of the area in which the electronic device 101 is located, obtained through a network search related to the registered PLMN(RPLMN), the home PLMN (HPLMN), and/or the preferred PLMN (PPLMN).

According to various embodiments, in operation 507, the electronic device (e.g., the processor 120 or 300) may identify whether the country in which the electronic device 101 is located has changed. According to an embodiment, in a case where the MCC of the area where the electronic device 101 is located is different from the MCC of the registered PLMN of the electronic device 101, the processor 300 may determine that the country in which the electronic device 101 is located has changed. According to an embodiment, in a case where the MCC of the area where the electronic device 101 is located is the same as the MCC of the registered PLMN of the electronic device 101, the processor 300 may determine that the country in which the electronic device 101 is located has not been changed.

According to various embodiments, when it is determined that the country in which the electronic device 101 is located has changed (e.g., 'Yes' in operation 507), the electronic device (e.g., the processor 120 or 300) may obtain network information of at least one external electronic device 220 through direct communication in operation 509. According to an embodiment, the processor 300 may obtain network information of at least one external electronic device 220 from a response message related to network information received through the second communication circuit 320 in response to a request message related to network information transmitted in operation 503 through direct communication. For example, the response message related to the network information may include a BLE response message or a BLE advertising message including indication information related to the response of the network information and/or network information of the external electronic device 220.

According to various embodiments, in a case where the cellular communication of the electronic device 101 is inactive (e.g., 'No' in operation 501) or the country in which the electronic device 101 is located is determined to be unchanged (e.g., 'No' in operation 507), the electronic device (e.g., the processor 120 or 300) may terminate the process for obtaining network information.

Figure 6:
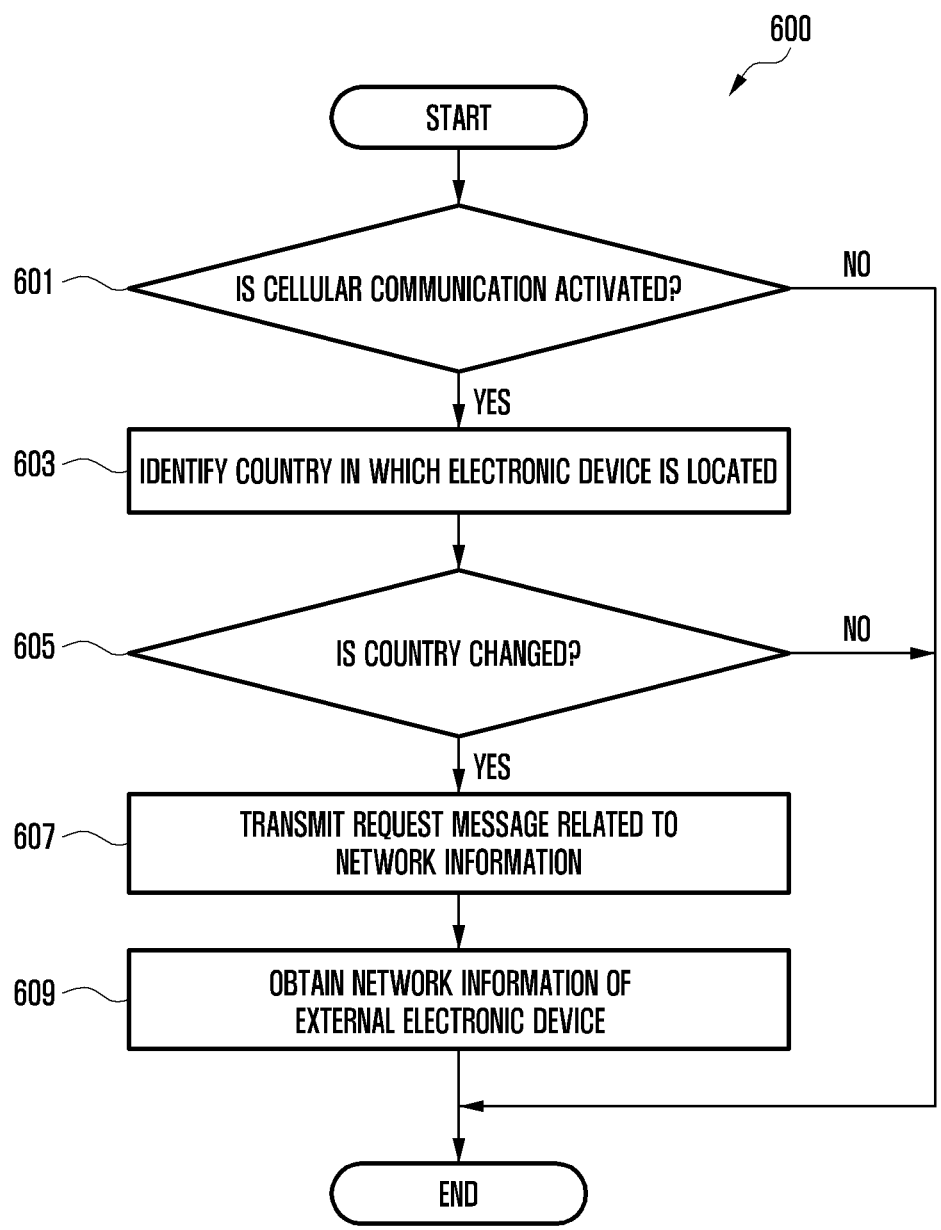
FIG. 6 is a flowchart illustrating an example process for obtaining network information in an electronic device according to various embodiments.

FIG. 6 is a flowchart 600 illustrating an example process of obtaining network information in an electronic device according to various embodiments. According to an embodiment, at least a portion of FIG. 6 may be detailed operations of operations 401 and 403 of FIG. 4. In the following embodiment, each operation may be sequentially performed, but is not necessarily sequentially performed. For example, the order of each operation may be changed, and at least two operations may be performed in parallel. For example, the electronic device of FIG. 6 may be the electronic device 101 of FIG. 1, 2, or 3.

According to various embodiments with reference to FIG. 6, in operation 601, the electronic device (e.g., the processor 120 of FIG. 1 or the processor 300 of FIG. 3) may identify whether cellular communication of the electronic device 101 is activated. According to an embodiment, in a case where power is supplied to the electronic device 101 (e.g., power on), airplane mode of the electronic device 101 is canceled, or a menu related to activation of the cellular mode of the electronic device 101 is configured, the processor 300 may determine that the first communication circuit 310 in the inactive state is switched to the active state to activate cellular communication of the electronic device 101.

According to various embodiments, in a case where the cellular communication of the electronic device 101 is activated (e.g., 'Yes' in operation 601), the electronic device (e.g., the processor 120 or 300) may identify a country in which the electronic device 101 is located in operation 603. According to an embodiment, the processor 300 may identify the country in which the electronic device 101 is located based on the MCC and/or MNC of the area where the electronic device 101 is located. For example, the MCC and/or MNC in the area where the electronic device 101 is located may be obtained through a network search related to the MCC and/or a network search related to the registration PLMN (RPLMN), the home PLMN (HPLMN), and/or the preferred PLMN (PPLMN).

According to various embodiments, in operation 605, the electronic device (e.g., the processor 120 or 300) may identify whether the country in which the electronic device 101 is located has changed. According to an embodiment, in a case where the MCC of the area where the electronic device 101 is located is different from the MCC of the registered PLMN of the electronic device 101, the processor 300 may determine that the country in which the electronic device 101 is located has changed. According to an embodiment, in a case where the MCC of the area where the electronic device 101 is located is the same as the MCC of the registered PLMN of the electronic device 101, the processor 300 may determine that the country in which the electronic device 101 is located has not been changed.

According to various embodiments, when it is determined that the country in which the electronic device 101 is located has changed (e.g., 'Yes' in operation 605), the electronic device (e.g., the processor 120 or 300) may transmit (or broadcast) a request message related to the network information through direct communication in operation 607. According to an embodiment, when it is determined that the country in which the electronic device 101 is located has changed, the processor 300 may control the second communication circuit 320 to transmit (or broadcast) the request message related to network information through direct communication. For example, the request message related to the network information may include a BLE advertising message including indication information related to the request of the network information and/or information (e.g., MCC and/or MNC) related to the home PLMN of the electronic device 101.

According to various embodiments, in operation 609, the electronic device (e.g., the processor 120 or 300) may obtain network information of at least one external electronic device 220 through direct communication. According to an embodiment, the processor 300 may obtain network information of at least one external electronic device 220 from a response message related to network information received through the second communication circuit 320 in response to a request message related to network information transmitted through direct communication. For example, the response message related to the network information may include a BLE response message or a BLE advertising message including indication information related to the response of the network information and/or network information of the external electronic device 220.

According to various embodiments, in a case where the cellular communication of the electronic device 101 is inactive (e.g., 'No' in operation 601) or the country in which the electronic device 101 is located is determined to be unchanged (e.g., 'No' in operation 605), the electronic device (e.g., the processor 120 or 300) may terminate the process for obtaining network information.

Figure 7:
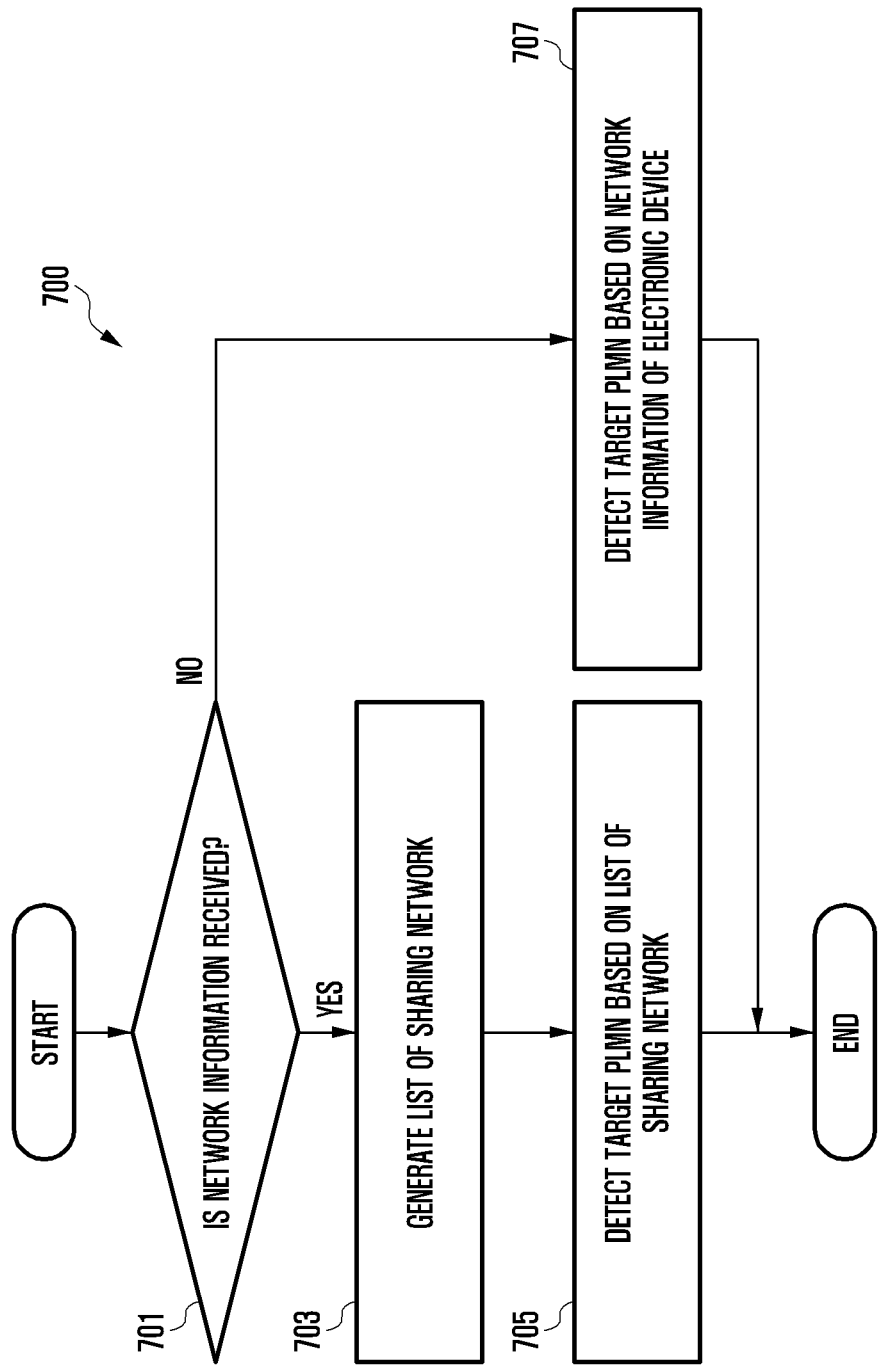
FIG. 7 is a flowchart illustrating an example process for configuring a target PLMN in an electronic device according to various embodiments.

FIG. 7 is a flowchart 700 illustrating an example process of configuring a target PLMN in an electronic device according to various embodiments. According to an embodiment, at least a portion of FIG. 7 may be detailed operations of operations 401 and 403 of FIG. 4. In the following embodiment, each operation may be sequentially performed, but is not necessarily sequentially performed. For example, the order of each operation may be changed, and at least two operations may be performed in parallel. For example, the electronic device of FIG. 7 may be the electronic device 101 of FIG. 1, 2, or 3.

According to various embodiments with reference to FIG. 7, when it is determined that the country in which the electronic device 101 is located has changed (e.g., "Yes" of operation 401 of FIG. 4), the electronic device (e.g., the processor 120 of FIG. 1 or the processor 300 of FIG. 3) may identify whether network information of the external electronic device 220 is received through direct communication in operation 701. According to an embodiment, the processor 300 may identify whether network information of at least one external electronic device 220 is received through the second communication circuit 320 in response to a request message related to the network information transmitted through direct communication. For example, the network information of the external electronic device 220 may be included in the response message related to the network information. For example, the response message related to the network information may include a BLE response message or a BLE advertising message including indication information related to the response of the network information and/or network information of the external electronic device 220. For example, the network information of the external electronic device 220 may include information related to the PLMN and RAT of the external electronic device 220, a registration state of the external electronic device 220 to the network, and/or a registration time point of the external electronic device 220.

According to various embodiments, in a case where the electronic device receives network information of at least one external electronic device 220 through direct communication (e.g., 'Yes' of operation 701), in operation 703, the electronic device (e.g., the processor 120 or 300) may generate (or update) a shared network list corresponding to a country in which the electronic device 101 is located based on network information of at least one external electronic device 220. For example, the shared network list may be generated (updated) by removing redundant network information (e.g., redundant PLMNs) from network information of at least one external electronic device 220. For example, the shared network list may include information related to at least one PLMN to which the external electronic device 220 is registered or to be registered.

According to various embodiments, in operation 705, the electronic device 101 may detect a target PLMN for registration by the electronic device 101 based on the shared network list and/or network information of the electronic device 101. According to an embodiment, the processor 300 may select the PLMN closest to the current time point of registration to the network as the target PLMN among the PLMNs included in the shared network list and the network information of the electronic device 101. For example, the network information of the electronic device 101 may include information related to at least one PLMN in which the electronic device 101 is registered in the country in which the electronic device 101 is located.

According to various embodiments, in a case where network information of at least one external electronic device 220 is not received through direct communication (e.g., "No" in operation 701), in operation 707, the electronic device (e.g., the processor 120 or 300) may detect a target PLMN for registration by the electronic device 101 based on network information of the electronic device 101 corresponding to the country in which the electronic device 101 is located. According to an embodiment, the processor 300 may select the PLMN closest to the current time point of registration to the network as the target PLMN among the PLMNs included in the network information of the electronic device 101 corresponding to a country in which the electronic device 101 is located.

According to various embodiments, when the target PLMN is detected, the electronic device 101 may perform a network search related to the target PLMN. The electronic device 101 may perform a network registration procedure through a cell detected through the network search related to the target PLMN.

According to various embodiments, in a case where network information of at least one external electronic device 220 is received through direct communication (e.g., "Yes" in operation 701), the electronic device (e.g., the processor 120 or 300) may detect network information of the external electronic device 220 related to at least one PLMN stored in the universal subscriber identity module (USIM) used by the electronic device 101 among network information of at least one external electronic device 220. According to an embodiment, the processor 300 may detect network information of the external electronic device 220 related to the home PLMN of the electronic device 101 among network information of the at least one external electronic device 220 obtained through direct communication. For example, the processor 300 may extract network information of the external electronic device 220 including the same home PLMN as the home PLMN of the electronic device 101 from network information of at least one external electronic device 220 obtained through direct communication. According to an embodiment, the processor 300 may generate (or update) a shared network list corresponding to a country in which the electronic device 101 is located based on network information of the external electronic device 220 related to the home PLMN of the electronic device 101.

Figure 8:
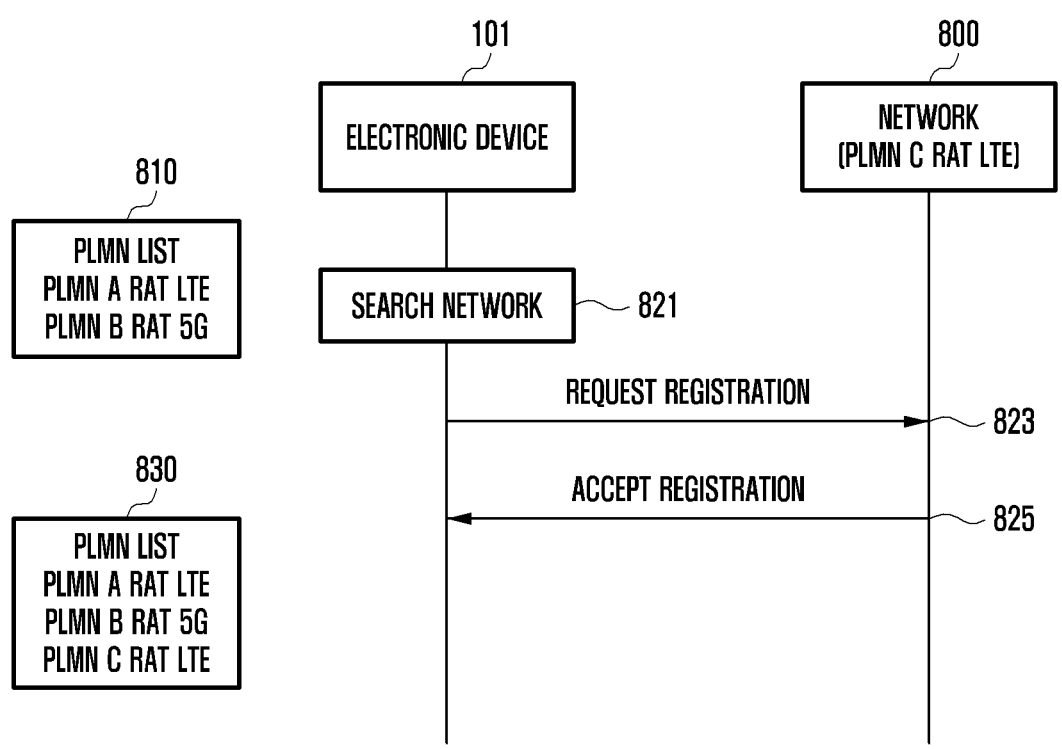
FIG. 8 is a signal flow diagram illustrating an example of updating network information in an electronic device according to various embodiments.

FIG. 8 is a signal flow diagram illustrating an example process of updating network information in an electronic device according to various embodiments.

According to various embodiments with reference to FIG. 8, the electronic device 101 may detect a network (or cell 800) for access by the electronic device 101 through a network search (operation 821).

According to various embodiments, the electronic device 101 may transmit a registration request message to the network (or cell 800) detected through a network search for access by the electronic device 101 (operation 823).

According to various embodiments, in a case where the electronic device 101 receives the registration acceptance message in response to the registration request message (operation 825), the electronic device 101 may determine that registration is completed in the network (or cell) 800.

According to various embodiments, the electronic device 101 may generate and/or update the network information (or network list) of the electronic device 101 based on information on the network in which the electronic device 101 has been registered. According to an embodiment, in a case where the network information of the electronic device 101 corresponding to a country in which the electronic device 101 is located does not exist, the electronic device 101 may generate network information (or network list) of the electronic device 101 including information of the registered network.

According to an embodiment, in a case where the network information of the electronic device 101 corresponding to a country in which the electronic device 101 is located exists, the electronic device 101 may update network information of the electronic device 101 based on information on the network in which the electronic device 101 has been registered. For example, the electronic device 101 may include network information 810 of the electronic device 101 including "PLMN A, RAT LTE" and "PLMN B, RAT 5G". The electronic device 101 may add information (e.g., PLMN C and RAT LTE) of the registered network of the electronic device 101 to the network information of the electronic device 101 (operation 830).

Figure 9:
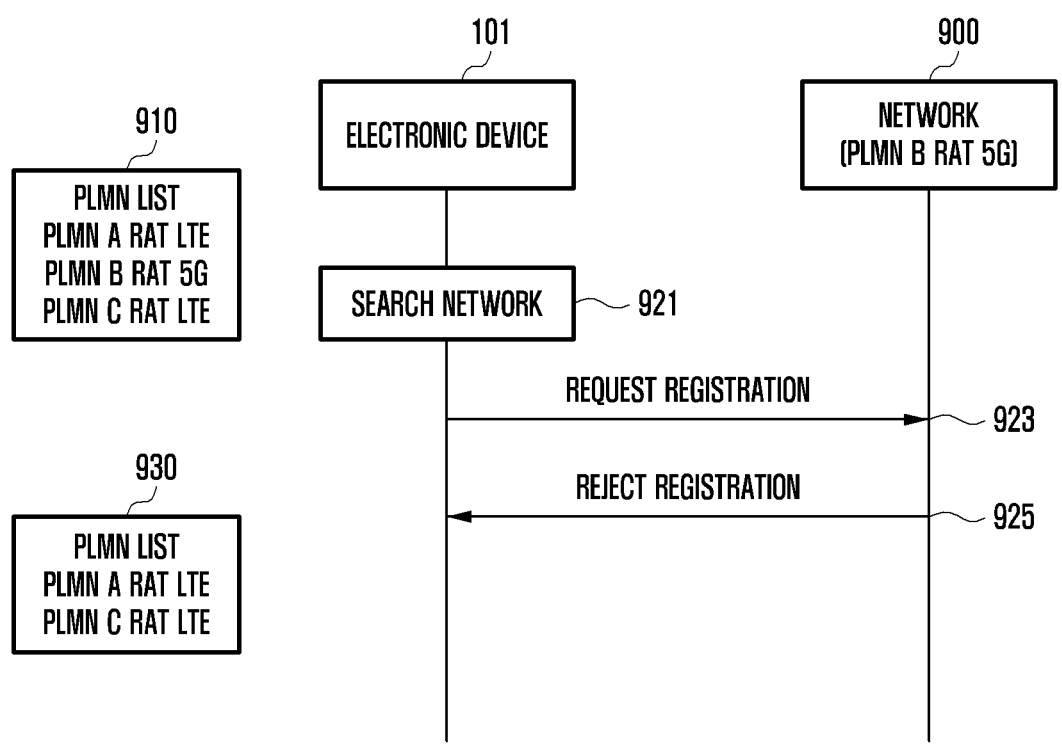
FIG. 9 is a signal flow diagram illustrating an example of updating network information in an electronic device according to various embodiments.

FIG. 9 is a signal flow diagram illustrating an example process of updating network information in an electronic device according to various embodiments.

According to various embodiments with reference to FIG. 9, the electronic device 101 may detect a network (or cell 900) for access by the electronic device 101 through a network search (operation 921).

According to various embodiments, the electronic device 101 may transmit a registration request message to the network (or cell 900) detected through a network search for access by the electronic device 101 (operation 923). According to an embodiment, when a network (e.g., PLMNB and RAT 5G) included in the network information 910 of the electronic device 101 is searched, the electronic device 101 may transmit a registration request message to the corresponding network.

According to various embodiments, in a case where the electronic device 101 receives the registration rejection message in response to the registration request message (operation 925), the electronic device 101 may determine that registration has failed in the network (or cell).

According to various embodiments, the electronic device 101 may update the network information of the electronic device 101 based on the information of the network in which registration of the electronic device 101 has failed. According to an embodiment, the electronic device 101 may include the network information 910 of the electronic device 101 including "PLMNA, RAT LTE", "PLMNB, RAT 5G", and "PLMNC, RAT LTE". The electronic device 101 may delete information (e.g., PLMNB and RAT 5G) of the network in which the electronic device 101 fails to register from the network information of the electronic device 101 (operation 930).

Figure 10:
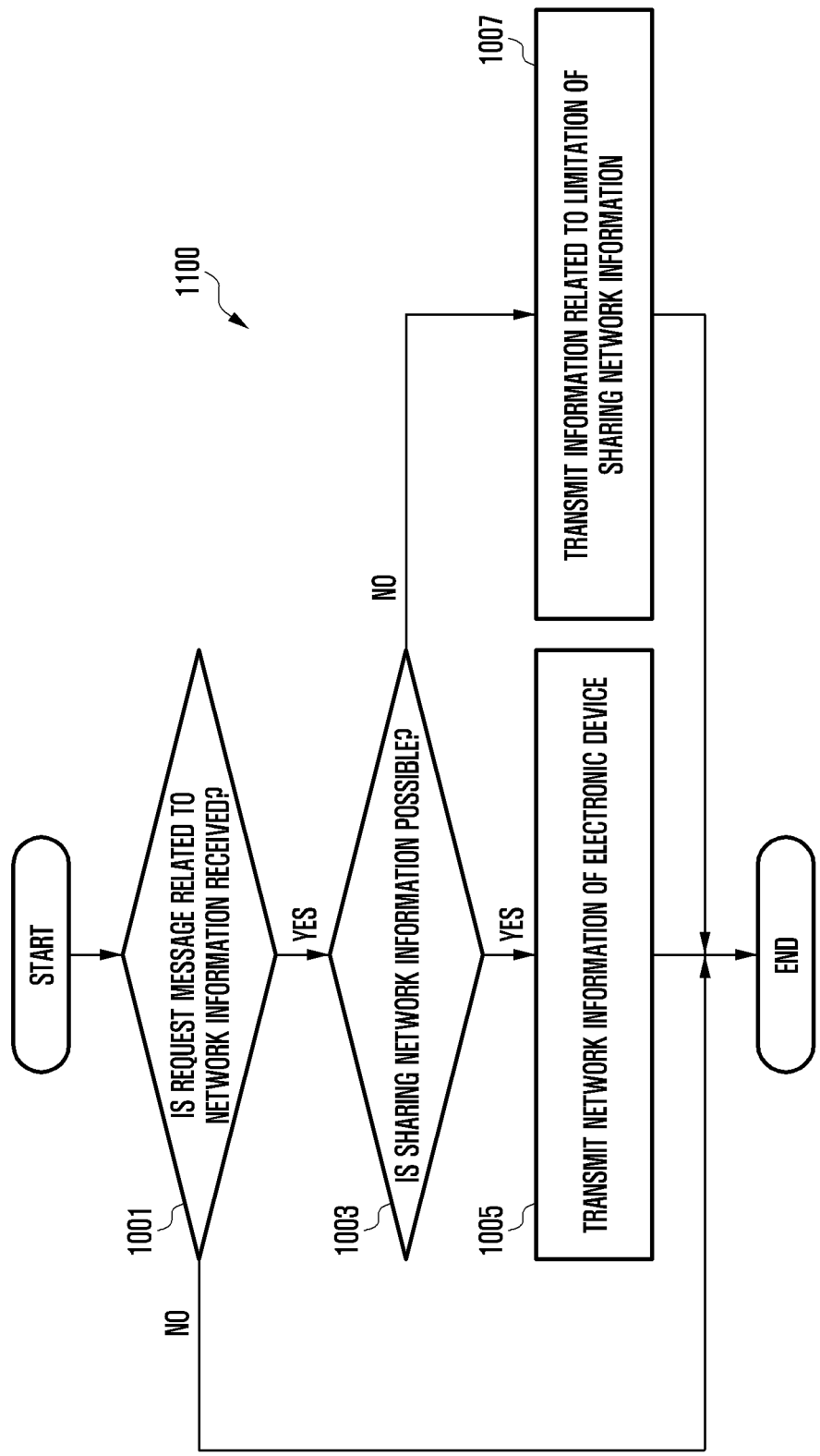
FIG. 10 is a flowchart illustrating an example process for sharing network information in an electronic device according to various embodiments.

FIG. 10 is a flowchart 1000 illustrating an example process of sharing network information in an electronic device according to various embodiments. In the following embodiment, each operation may be sequentially performed, but is not necessarily sequentially performed. For example, the order of each operation may be changed, and at least two operations may be performed in parallel. For example, the electronic device of FIG. 10 may be the electronic device 101 of FIG. 1, 2, or 3.

According to various embodiments with reference to FIG. 10, the electronic device (e.g., the processor 120 of FIG. 1 or the processor 300 of FIG. 3) may identify whether the request message related to the network information is received through direct communication in operation 1001. For example, the request message related to the network information may include a BLE advertising message including indication information related to the request of the network information and/or information related to the home PLMN of the electronic device 101 (e.g., MCC and/or MNC).

According to various embodiments, in a case where a request message related to the network information is not received through direct communication (e.g., 'No' in operation 1001), the electronic device (e.g., the processor 120 or 300) may terminate the process for sharing the network information of the electronic device 101.

According to various embodiments, in a case where a request message related to the network information is received through direct communication (e.g., 'Yes' in operation 1001), the electronic device (e.g., the processor 120 or 300) may determine whether to share the network information with the external electronic device 220 based on the request message related to the network information in operation 1003. According to an embodiment, in a case where a request message related to the network information is received through the second communication circuit 320, the processor 300 may identify whether the request message related to the network information satisfies the designated sharing condition. When it is determined that the request message related to the network information satisfies the designated sharing condition, the processor 300 may determine whether to share the network information with the external electronic device 220. For example, the state satisfying the specified sharing condition may include a state in which the identification information of the external electronic device 101 related to the direct communication is included in the identification information configured for sharing the network information. For example, the identification information of the external electronic device 220 may include a communication operator (e.g., a home PLMN) operating a cellular network supported by the external electronic device 220, a manufacturer of the external electronic device 220, and/or a predefined shared identity (ID). For example, the processor 300 may obtain information related to the home PLMN of the external electronic device 220 included in the request message related to network information. In a case where the home PLMN of the external electronic device 220 is the same as the home PLMN of the electronic device 101, the processor 300 may determine that network information is shared with the external electronic device 220. In a case where the home PLMN of the external electronic device 220 is different from the home PLMN of the electronic device 101, the processor 300 may determine that network information is not shared with the external electronic device 220.

According to various embodiments, when it is determined that network information is shared with the external electronic device 220 (e.g., 'Yes' in operation 1003), the electronic device (e.g., the processor 120 or 300) may transmit the network information of the electronic device 101 through direct communication in operation 1005. According to an embodiment, when it is determined that network information is shared with the external electronic device 220, the processor 300 may control the second communication circuit 320 to transmit a response message related to the network information including the network information of the electronic device 101. For example, the response message related to the network information may include a BLE response message or a BLE advertising message.

According to various embodiments, when it is determined that network information is not shared with the external electronic device 220 (e.g., 'No' in operation 1003), the electronic device (e.g., the processor 120 or 300) may transmit information related to a sharing limitation of the network information through direct communication in operation 1007. According to an embodiment, when it is determined that network information is not shared with the external electronic device 220, the processor 300 may control the second communication circuit 320 to transmit a response message including the information related to a sharing limitation of network information. For example, the response message related to the network information may include a BLE response message or a BLE advertising message.

According to various example embodiments, a method of operating an electronic device (e.g., the electronic device 101 of FIG. 1, 2 or 3) may include: identifying a country in which the electronic device is located through cellular communication, obtaining network information of at least one external electronic device through direct communication based on a Bluetooth low energy (BLE) based on determining that the country in which the electronic device is located has changed, detecting a public land mobile network (PLMN) to which the electronic device is accessible based on the network information of the at least one external electronic device, performing a network search related to the detected PLMN through the cellular communication, and performing a network registration procedure through a detected cell based on the network search through the cellular communication.

According to various example embodiments, the identifying a country in which the electronic device is located may include: identifying at least one of a mobile country code (MCC) or a mobile network code (MNC) of an area in which the electronic device is located based on the cellular communication of the electronic device being activated, and identifying a country in which the electronic device is located based on at least one of the MCC and the MNC.

According to various example embodiments, at least one of the MCC or the MNC may be identified based on at least one of a master information block (MIB) or a system information block 1 (SIB1) obtained through the cellular communication.

According to various example embodiments, transmitting a BLE advertising request message including information related to a home PLMN (HPLMN) of the electronic device through direct communication based on the BLE may be further included, and obtaining network information may include: obtaining network information of the at least one external electronic device from a response message received from at least one external electronic device in response to the BLE advertising request message.

According to various example embodiments, transmitting a request message may include transmitting a BLE advertising request message including information related to a home PLMN (HPLMN) of the electronic device through direct communication based on the BLE based on the cellular communication of the electronic device being activated.

According to various example embodiments, transmitting a request message may include: transmitting a BLE advertising request message including information related to a home PLMN (HPLMN) of the electronic device through direct communication based on the BLE based on determining that the country in which the electronic device is located has changed.

According to various example embodiments, the network information of the external electronic device may include information related to a PLMN, a radio access technology (RAT), a registration state, and/or a registration time.

According to various example embodiments, detecting the PLMN may include detecting a PLMN to which the electronic device is accessible based on a registration time of the PLMN included in the network information of the at least one external electronic device.

According to various example embodiments, detecting the PLMN to which the electronic device is accessible based on network information of the electronic device corresponding to a country in which the electronic device is located may be further included based on the network information of at least one external electronic device through direct communication using the second communication circuit not being obtained.

According to various example embodiments, identifying information related to a home PLMN (HPLMN) included in the request message may be further included based on the BLE advertising request message being received through the direct communication based on the BLE, and transmitting a response message including network information of the electronic device through the second communication circuit may be further included based on determining that the HPLMN-related information included in the request message satisfies a designated sharing condition.

The embodiments of the disclosure disclosed in the disclosure and drawings are merely examples to explain the technical contents of the disclosure and to aid in understanding the disclosure, and are not intended to limit the scope of the disclosure. Therefore, in addition to the embodiments disclosed herein, all modified or modified forms that are derived based on the technical idea of the disclosure may be understood as being included within the scope of the disclosure.

Further, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory storing instructions;

a first communication circuit configured to support cellular communication;
a second communication circuit configured to support Bluetooth low energy (BLE) communication; and
a processor operatively connected with the memory, the first communication circuit, and the second communication circuit and including processing circuitry,
wherein the instructions, when executed by the processor, cause the electronic device to:
obtain network information of at least one external electronic device through the BLE communication using the second communication circuit transmitting a BLE advertising request message having information related to a home public land mobile network (HPLMN) of the electronic device through the second communication circuit based on the first communication circuit in an inactive state being switched to an active state;
identify a public land mobile network (PLMN) to which the electronic device is accessible using the obtained network information from the at least one external electronic device;
perform, via the first communication circuit, a network search related to the identified PLMN; and
perform, via the first communication circuit, a network registration procedure through a cell searched based on the network search.

2. The electronic device of claim 1, wherein based on the first communication circuit in the inactive state being switched to the active state, the memory storing instructions, when executed by the processor, cause the electronic device to:
identify at least one of a mobile country code (MCC) or a mobile network code (MNC) of an area in which the electronic device is located; and
identify a country in which the electronic device is located based on at least one of the MCC and the MNC.

3. The electronic device of claim 2, wherein the instructions, when executed by the processor, cause the electronic device to identify at least one of the MCC or the MNC of an area in which the electronic device is located based on at least one of a master information block (MIB) or a system information block 1 (SIB1) obtained through the first communication circuit switched to the active state.

4. The electronic device of claim 1, wherein the instructions, when executed by the processor, cause the electronic device to:
transmit, via the second communication circuit, the BLE advertising request message including information related to the HPLMN of the electronic device based on the first communication circuit in the inactive state being switched to the active state; and
obtain, via the second communication circuit, the network information of the at least one external electronic device from a response message received from the at least one external electronic device in response to the BLE advertising request message.

5. The electronic device of claim 4, wherein the instructions, when executed by the processor, cause the electronic device to: transmit, via the second communication circuit, the BLE advertising request message including information related to the HPLMN of the electronic device based on determining that a country in which the electronic device is located has changed.

6. The electronic device of claim 1, wherein the network information of the at least one external electronic device includes at least one of information related to a PLMN where the at least one external electronic device was previously registered or is currently registered, information related to a radio access technology (RAT) of the PLMN, information indicating whether the external electronic device is currently or previously registered on a network of the PLMN, or information indicating when the external electronic device was registered to the network.

7. The electronic device of claim 6, wherein the instructions, when executed by the processor, cause the electronic device to: select the PLMN to which the electronic device is accessible based on a registration time of a PLMN included in the obtained network information from the at least one external electronic device and a registration time of PLMN included in a network information of the electronic device,
wherein the selected PLMN is the same as or different from the PLMN where the at least one external electronic device was previously registered or is currently registered.

8. The electronic device of claim 1, wherein the memory storing instructions, when executed by the processor, cause the electronic device to select the PLMN to which the electronic device is accessible based on network information of the electronic device corresponding to the country in which the electronic device is located based on the electronic device not obtaining network information of the at least one external electronic device through direct communication using the second communication circuit.

9. A method of operating an electronic device, the method comprising:
obtaining network information of at least one external electronic device through direct communication based on a Bluetooth low energy (BLE) communication including transmitting a BLE advertising request message including information related to a home public land mobile network (HPLMN) of the electronic device through the direct communication based on a cellular communication of the electronic device in an inactive state being switched to an active state;
identifying a public land mobile network (PLMN) to which the electronic device is accessible based on the obtained network information from the at least one external electronic device;
performing a network search related to the identified PLMN through the cellular communication; and
performing a network registration procedure through a cell searched based on the network search through the cellular communication.

10. The method of claim 9, wherein the identifying the country in which the electronic device is located comprises:
identifying at least one of a mobile country code (MCC) or a mobile network code (MNC) of an area in which the electronic device is located based on the cellular communication of the electronic device being activated; and
identifying the country in which the electronic device is located based on at least one of the MCC and the MNC.

11. The method of claim 10, wherein the at least one of the MCC or the MNC is identified based on at least one of a master information block (MIB) or a system information block 1 (SIB1) obtained through the cellular communication.

12. The method of claim 9, wherein the obtaining network information comprises obtaining the network information of the at least one external electronic device from a response message received from the at least one external electronic device in response to the BLE advertising request message.

13. The method of claim 12, wherein the transmitting the BLE advertising request message comprises: transmitting the BLE advertising request message including information related to the HPLMN of the electronic device through direct communication based on the BLE based on determining that a country in which the electronic device is located has changed.

14. The method of claim 9, wherein the network information of the at least one external electronic device comprises at least one of information related to a PLMN where the at least one external electronic device was previously registered or is currently registered, information related to a radio access technology (RAT) of the PLMN, information indicating whether the external electronic device is currently or previously registered on a network of the PLMN, or information indicating when the external electronic device was registered to the network.

15. The method of claim 14, wherein the identifying the PLMN comprises selecting the PLMN to which the electronic device is accessible based on a registration time of a PLMN included in the obtained network information from the at least one external electronic device and a registration time of a PLMN included in the network information of the electronic device,
wherein the selected PLMN is same as or different from the PLMN where the at least one external electronic device was previously registered or is currently registered.

16. The method of claim 9, further comprising: selecting the PLMN to which the electronic device is accessible based on network information of the electronic device corresponding to the country in which the electronic device is located based on the network information of the at least one external electronic device through direct communication not being obtained.

\* \* \* \* \*